United States Patent [19]
Arkell et al.

[11] 3,821,314
[45] June 28, 1974

[54] RECOVERY OF CYCLOHEXYLBENZENE HYDROPEROXIDE FROM REACTION MIXTURES

[75] Inventors: Alfred Arkell, Wappingers Falls; Raymond C. Schlicht, Fishkill; Frederic C. McCoy, Beacon, all of N.Y.

[73] Assignee: Texaco Inc., New York, N.Y.

[22] Filed: Feb. 9, 1972

[21] Appl. No.: 224,959

[52] U.S. Cl............. 260/610 A, 260/674 A, 260/590
[51] Int. Cl................................................. C07c 73/00
[58] Field of Search........ 260/610 A, 482, 708, 704

[56] References Cited
UNITED STATES PATENTS
3,102,918  9/1963  Heise ........................... 260/610 A FOREIGN PATENTS OR APPLICATIONS
573,072   3/1959   Canada........................ 260/610 A
740,022  11/1955   Great Britain................ 260/621 C OTHER PUBLICATIONS
Saunders–Frisch "Polyurethane Chem. and Techn. Part 1," Vol. VI, pp. 32–48.

*Primary Examiner*—Leon Zitver
*Assistant Examiner*—Nicky Chan
*Attorney, Agent, or Firm*—T. H. Whaley; C. G. Reis

[57] ABSTRACT

Separation of cyclohexylbenzene hydroperoxide from, for example, a mixture of cyclohexylbenzene and its oxidation products is accomplished by extraction of the oxidation products by means of polyurethane foam. Separation of the oxidation products is achieved in a two step desorption operation.

8 Claims, No Drawings

RECOVERY OF CYCLOHEXYLBENZENE HYDROPEROXIDE FROM REACTION MIXTURES

The present invention has to do with the removal, or adsorption, of cyclohexylbenzene hydroperoxide and associated oxidation products from a solution of cyclohexylbenzene and its oxidation products. This invention also relates to the separation and recovery of cyclohexylbenzene hydroperoxide and cyclohexylbenzene from such mixtures.

In one of the methods employed for the manufacture of phenol and cyclohexanone, benzene is hydroalkylated in the first step to form cyclohexylbenzene which is oxidized to cyclohexylbenzene hydroperoxide and finally the hydroperoxide is subjected to cleavage in the presence of a mineral acid, such as sulfuric acid, to form the desired phenol and cyclohexanone. To make such a process economically sound it is not only necessary to recover the desired cyclohexylbenzene hydroperoxide but to recover and recycle unreacted cyclohexylbenzene as well.

A variety of methods have been employed in the art to effect the separation of the unreacted cyclohexylbenzene from reaction mixtures of the type described above. For example, the separation of the cyclohexylbenzene has been attempted using high vacuum distillation but because of the elaborate equipment required, low throughput and expense involved in making such a separation, this method has not been found to be suitable. Likewise, methods previously proposed for the recovery of the desired cyclohexylbenzene hydroperoxide from the reaction mixture as well as from the simultaneously produced 5-benzoyl-1-pentyl-hydroperoxide are difficult to accomplish because they involve the separation of two hydroperoxides. Thus, although a number of schemes have been proposed for this complicated overall separation process, all suffer from one or more serious disadvantages.

There is a definite need in the art for an efficient process which will provide for the recovery of the desired cyclohexylbenzene hydroperoxide from other simultaneously produced oxidation products and for the recovery of unreacted cyclohexylbenzene from the reaction mixture for recycling to the process.

In accordance with the present invention it has been found that effective separation of cyclohexylbenzene hydroperoxide from cyclohexylbenzene, cyclohexylbenzene hydroperoxide and 5-benzoyl-pentyl-hydroperoxide as a solution of these materials in a hydrocarbon solvent can be conveniently realized by adsorption upon polyurethane foam.

The adsorption takes place readily, and regeneration is simple and complete. The adsorbent is relatively cheap since it is currently made in multi-million pound quantities for many other uses. Its high surface availability makes it relatively inexpensive to use and readily adaptable to operations which are designed to effect the necessary contact. Also, it is quite readily regenerated and may be recycled through successive adsorption and regeneration steps for an indefinite number of times.

Also, surprisingly, the hydroperoxides are adsorbed to the exclusion of other materials, and particularly to the exclusion of cyclohexylbenzene and hydrocarbon solvent mixtures. It is likewise surprising that the cyclohexylbenzene hydroperoxide and the 5-benzoyl-1-pentyl hydroperoxide adsorbed on polyurethane foam from a hydrocarbon solution of these two materials can be separated selectively by eluting the cyclohexylbenzene hydroperoxides from the adsorbent by washing it with pentane or similar nonpolar hydrocarbon. The 5-benzoyl-1-pentyl hydroperoxide can then be eluted with a polar solvent such as diethyl ether, acetone, etc. Cyclohexylbenzene recovered can be recycled to the oxidation step of the overall process with resultant reduction in the cost of the desired cyclohexylbenzene hydroperoxide product.

Hydrocarbon liquids which may form a part of the cyclohexylbenzene, cyclohexylbenzene hydroperoxide, 5-benzoyl-1-pentyl-hydroperoxide hydrocarbon solutions include, for example, pentane, hexane isohexane, heptane, methyl-cyclohexane, etc. The process of this invention is particularly applicable to the separation of cyclohexylbenzene, cyclohexylbenzene hydroperoxide, and 5-benzoyl-1-pentyl hydroperoxide from mixtures of these materials in hydrocarbon solutions.

In the process of this invention cyclohexylbenzene hydroperoxide is separated from a solution of cyclohexylbenzene, cyclohexylbenzene hydroperoxide and 5-benzoyl-1-pentyl-hydroperoxide in a hydrocarbon solvent by:

a. contacting the said solution with a polyurethane foam for a sufficient length of time to adsorb a substantial portion of the said cyclohexylbenzene hydroperoxide and 5-benzoyl-1-pentyl-hydroperoxide contained in the said solution, b. separating the resulting liquid enriched in cyclohexylbenzene from the foam, c. treating the said foam with sufficient additional hydrocarbon solvent to remove therefrom the adsorbed cyclohexylbenzene hydroperoxide, and d. recovering cyclohexylbenzene hydroperoxide from the said hydrocarbon solution. Regeneration of the foam can be accomplished by contacting the said foam with a polar solvent such as diethyl ether, acetone, etc. to elute the 5-benzoyl-1-pentyl-hydroperoxide. Cyclohexylbenzene can be recovered from the enriched solution obtained in step (b) by distillation but preferably this solution is returned directly to the hydroalkylation step of the phenol process. In a like manner, cyclohexylbenzene hydroperoxide can be recovered from hydrocarbon solution obtained in step (c) by distillation or this solution may be recycled directly to the hydroperoxide cleavage step of the overall process.

In reference to the adsorbent material, the invention has broad application to all polyurethane foams whether the flexible type of foam or the relatively rigid foams.

It has, however, been found preferably to operate with the so-called "reticulate" type of foam, by which term is meant to include such foams as have interstices so interconnected as to form more or less continuous passages through the foam. This is to be distinguished from the "non-reticulate" foam on which the polyurethane has been expanded by a series of internal bubbles which are not necessarily interconnected and which, therefore, do not provide effective internal access by liquids or other fluids which are brought into contact therewith.

In order to yet further promote and facilitate surface contact between the solvent and adsorbent, the latter may be subdivided or shredded, which may be readily effected by means of any suitable shredding device. If a shredded foam is used the size of the foam particles may be from about 2 to about 40 mesh and preferably from about 4 to about 10 mesh.

From the chemical standpoint the polyurethane foam may be of either the so-called ester or ether type. To avoid extensive dissertation of the chemical nature of these products, reference is made to the Interscience Volume VI on Polyurethanes; Chemistry & Technology, Part I, by Saunders-Frisch (pages 32 through 48) which is included herein by reference.

As previously intimated, regeneration of the preferred polyurethane adsorbent is greatly facilitated by the fact that it may be conducted with various low boiling solvents and particularly that it is quickly and readily effected by means of a dialkyl ether, such as diethyl ether, dipropyl ether, ethyl-propyl ether, etc. and acetone, methyl-ethyl ketone, etc. When these solvents are used to regenerate polyurethane foam, the foam is not injured thereby and can be quickly and readily cycled through adsorption and regeneration for an indefinite number of times.

The characteristics of the adsorption in respect to temperature in general are essentially a straight line function in which adsorption appears to be facilitated by somewhat lower temperatures. In general, it is contemplated conducting such operations at temperatures in the range of say −20° to 50°C. Since, however, the lower portions of this range are somewhat more effective, it is usually convenient and preferable to conduct adsorption at temperatures in the range of 0° to 40°C. or preferably 20°–30°C.

All types of polyurethane foams are effective in removing cyclohexylbenzene hydroperoxide and 5-benzoyl-1-pentyl-hydroperoxide from the solutions previously defined. Foams with lower nitrogen appear to be the most effective adsorbents.

The following examples illustrate various embodiments of the invention and are to be considered not limitative.

EXAMPLE I

A total of 6.00 g of a mixture containing cyclohexylbenzene and hydroperoxide oxidation products (19.7 weight percent total hydroperoxide content) was dissolved in 25 ml of pentane and passed at room temperature into a (100 ml) column packed with 2.5 g of polyurethane foam of the ether type (40 cyclindrical pieces, ⅝ O.D.×⅞ inch in length). The pentane solution was allowed to percolate down through the column for a period of 5 minutes. The column was then flushed with two 25 ml. portions of pentane and the eluted material after stripping off the pentane weighed 4.63 g. A sample of this material, which had a titer of 1.64 weight percent hydroperoxide was submitted for infrared analysis and found to be cyclohexylbenzene containing a trace of a carbonyl compound. The column was then flushed successively with six portions (25 ml. each) of pentane and there was recovered (after distillation to remove the pentane) 1.10 g of material which on infrared analysis was found to be principally cyclohexylbenzene hydroperoxide together with a trace of cyclohexylbenzene and a carbonyl compound. The titer of this fraction was 87.8 weight percent hydroperoxide. Finally, the foam was washed with 50 ml. of ether and there was obtained 0.31 g of material which by infrared analysis was shown to be a carbonyl-containing hydroperoxide, that is, 5-benzoyl-1-pentyl-hydroperoxide, with traces of other oxidation impurities (titer — 81.8 weight percent hydroperoxide).

This experiment demonstrated that the bulk of the cycohexylbenzene was separated in the first two pentane flushes and that the desired hydroperoxide (i.e., cyclohexylbenzene hydroperoxide) has been effectively separated from the impurity hydroperoxide, 5-benzoyl-1-pentyl-hydroperoxide by continued pentane flushing.

EXAMPLE II

A second experiment was carried out utilizing the same apparatus and same column packing as employed in Example I. A total of 6.00 g of a reaction mixture containing cyclohexylbenzene together with the hydroperoxide reaction products i.e., cyclohexylbenzene hydroperoxide and 5-benzoyl-1-pentyl-hydroperoxide, (20.3 weight percent hydroperoxide, 1.22 g) was dissolved in 25 ml of pentane and introduced at room temperature into the column packed with polyurethane foam. Flushing with 75 ml of pentane yielded a first fraction which after removal of pentane was shown by infrared analysis to be almost pure cyclohexylbenzene containing small amounts of hexanophenone and cyclohexylbenzene hydroperoxide. The second series of pentane flushes (5 portions of 50 ml each) yielded (after evaporation of the pentane) a cyclohexylbenzene hydroperoxide fraction (91.7 weight percent purity) which also contained small amounts of cyclohexylbenzene and hexanophenone. The third fraction which was eluted with 50 ml of diethylether was a mixture of 5-benzoyl-1-pentyl-hydroperoxide and other oxidation impurities. The product distribution in each of the above-mentioned three fractions was determined by titration and infrared analysis.

Pertinent details relating to this example are found in Table 1 which follows.

TABLE I

Typical Separation of Cyclohexylbenzene and Cyclohexylbenzene Hydroperoxide from 5-Benzoyl-1-Pentyl-Hydroperoxide Using Polyurethane Foam[a]

Charge: 6.00 g of Reaction Mixture (20.3% Hydroperoxide; 1.22 g Theory)

| Pentane In (ml) | Pentane Out (ml) | Sample No | Wt. (g) Product | % Hydroperoxide[d] |
|---|---|---|---|---|
| 25 (solution) | | | | |
| 25 (wash) | | | | |
| 50 | 50 | 57.1 | 4.81 | 2.81% (0.135g) |
| 50 | 50 | 57.2 | 0.63 | |
| 50 | 50 | 57.3 | 0.24 | |
| 50 | 50 | 57.4 | 0.05[b] | |
| 50 | 50 | 57.5 | 0.04[b] | |
| | 50 | 57.6 | 0.02[b] | 91.7% (0.899 g) |
| 50 (Ether) | 50 | 57.7 | 0.243[b] | 80.1% (0.194 g) |

TABLE I—Continued

| Sample No. | Cyclohexyl-benzene + Impurities | Cyclohexyl-benzene Hydroperoxide | 5-Benzoyl-1-Pentyl-Hydroperoxide | Impurities[c] |
|---|---|---|---|---|
| 57.1 | 4.675 | 0.135 | | |
| 57.6 | 0.081 | 0.899 | | |
| 57.7 | | | 0.194 | 0.049 |
| | 4.756 | 1.034 | 0.194 | 0.049 |
| Wt. % | 79.3 | 17.26 | 3.24 | 0.82 |

[a] Forty pieces of foam (~ 2.5 g) in burette
[b] Taken to constant weight
[c] Impurities are hexanophenone, ROH, and benzoylvaleric acid.
[d] Standard iodometric titration using thiosulfate.

What is claimed is:

1. A process for recovering cyclohexylbenzene hydroperoxide from a solution of cyclohexylbenzene, cyclohexylbenzene hydroperoxide and 5-benzoyl-1-pentyl-hydroperoxide in a non-polar hydrocarbon solvent selected from the group consisting of alkanes and cycloalkanes which comprises:
   a. contacting the said solution with polyurethane foam at a temperature in the range of about −20° to +50°C. for a sufficient length of time to adsorb a substantial portion of the said cyclohexylbenzene hydroperoxide and 5-benzoyl-1-pentyl-hydroperoxide contained in the said solution,
   b. separating the resulting liquid enriched in cyclohexylbenzene from the foam,
   c. treating the said foam with sufficient additional hydrocarbon solvent to remove therefrom the adsorbed cyclohexylbenzene hydroperoxide, and
   d. recovering cyclohexylbenzene hydroperoxide from the said hydrocarbon solution.

2. The method according to claim 1 wherein said polyurethane foam is of the ester type.

3. The method according to claim 1 wherein the polyurethane foam is of the ether type.

4. The method according to claim 1 wherein the polyurethane foam is of the open-celled or reticulate type.

5. The method according to claim 1 wherein the resulting liquid separated in step (b) is distilled to yield cyclohexylbenzene.

6. The method according to claim 1 wherein the said solution is contacted with the polyurethane foam at a temperature in the range of about 20° to 30°C.

7. The method according to claim 1 wherein the polyurethane foam is in the form of particles in the neighborhood of about 2 to about 40 mesh size.

8. The method according to claim 1 wherein the said foam containing adsorbed 5-benzoyl-1-pentyl-hydroperoxide is regenerated by eluting with a material selected from the group consisting of diethyl ether, ethyl propyl ether, acetone, methyl ethyl ketone and tetrahydrofuran and recycling the regenerated foam to the adsorption step.

* * * * *